Aug. 7, 1962     C. O. MERCHANT     3,048,205
CEMENT DISPENSING APPARATUS
Filed June 9, 1958     10 Sheets-Sheet 1

INVENTOR.
Chester O. Merchant
BY
Charles L. Lovercheck
attorney

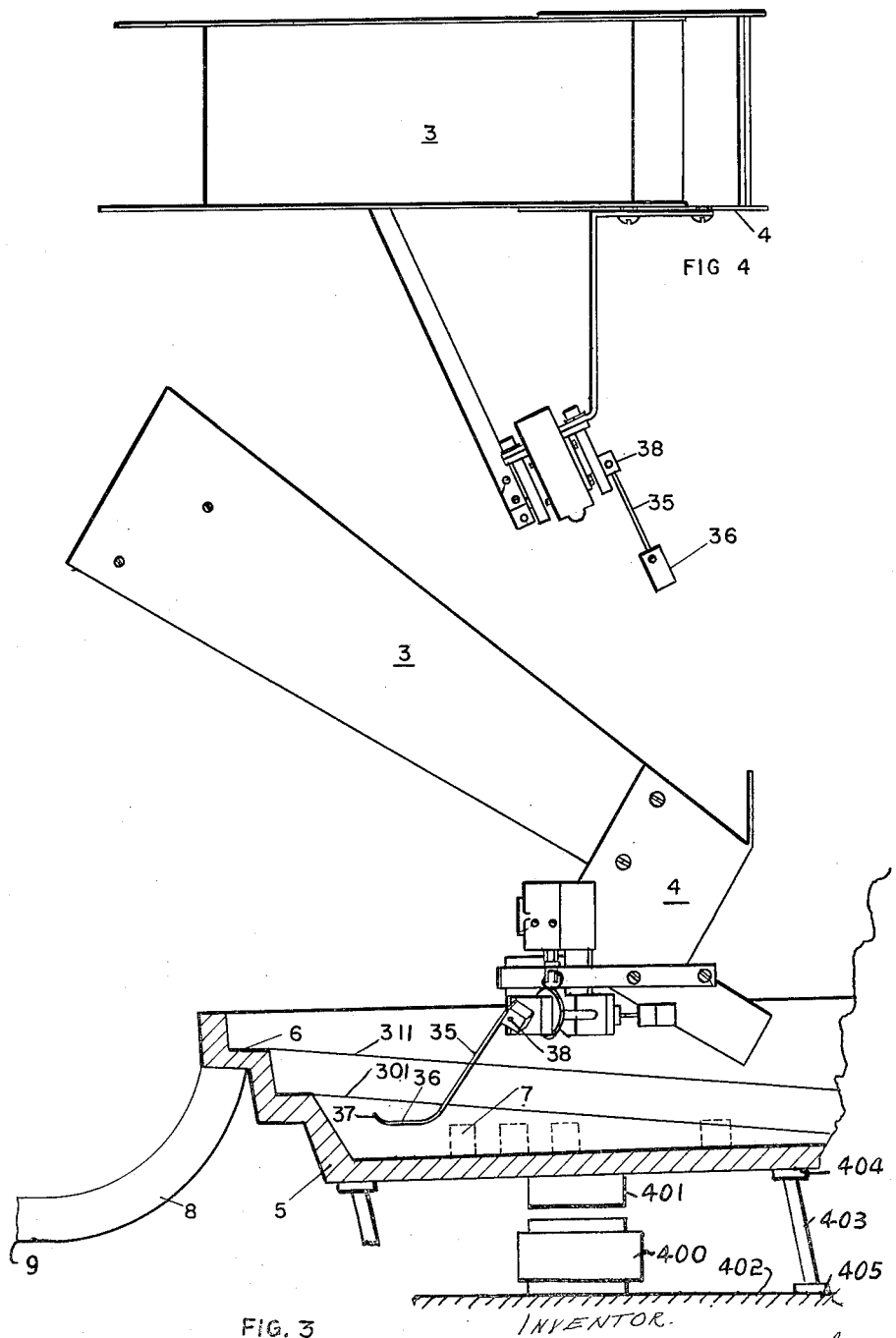

Aug. 7, 1962 C. O. MERCHANT 3,048,205
CEMENT DISPENSING APPARATUS
Filed June 9, 1958 10 Sheets-Sheet 8

INVENTOR.
Chester O Merchant
BY
Charles L. Loverched
atty

Aug. 7, 1962   C. O. MERCHANT   3,048,205
CEMENT DISPENSING APPARATUS
Filed June 9, 1958   10 Sheets-Sheet 9

INVENTOR
CHESTER O. MERCHANT
BY
Charles L. Lovecheck
attorney

Aug. 7, 1962 — C. O. MERCHANT — 3,048,205
CEMENT DISPENSING APPARATUS
Filed June 9, 1958 — 10 Sheets-Sheet 10

INVENTOR.
Chester O. Merchant
BY Charles L. Lauerbeck
attorney

United States Patent Office 3,048,205
Patented Aug. 7, 1962

3,048,205
CEMENT DISPENSING APPARATUS
Chester O. Merchant, Harborcreek Township, Erie County, Pa., assignor to Swanson-Erie Corporation, Erie, Pa., a corporation of Pennsylvania
Substitute for abandoned application Ser. No. 537,968, Oct. 3, 1955. This application June 9, 1958, Ser. No. 740,967
6 Claims. (Cl. 141—141)

This invention relates to machines for manufacturing light bulbs and, more particularly, to machines for depositing cement in base portions of light bulbs prior to the assembly operation of the base portion with the remainder of the bulb.

This application is a substitute application for patent application, Serial No. 537,968, filed October 3, 1955, which has been abandoned.

In the manufacture of electric light bulbs, it has long been a problem to deposit a proper quantity of cement in each base in the terminal portions of the light bulbs at a high rate of production. This invention contemplates an arrangement of machinery wherein the cement can be deposited into the light bulb base in a minimum of time.

More specifically, it is an object of this invention to provide a machine for carrying out a portion of the procedure in the manufacture of light bulbs wherein the machinery is simple in construction, economical to manufacture, and simple and efficient to use.

Another object of the invention is to provide a means for controlling the quantity of parts loaded in a vibratory parts feeder which comprises a portion of the invention.

A further object of the invention is to provide an improve means for depositing cement in an article of manufacture.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 3 is a view partly in cross section of a vibratory parts feeder which is fed by the conveyor shown in FIG. 1;

FIG. 4 is a top view of the device shown in FIG. 3;

Figure 1:
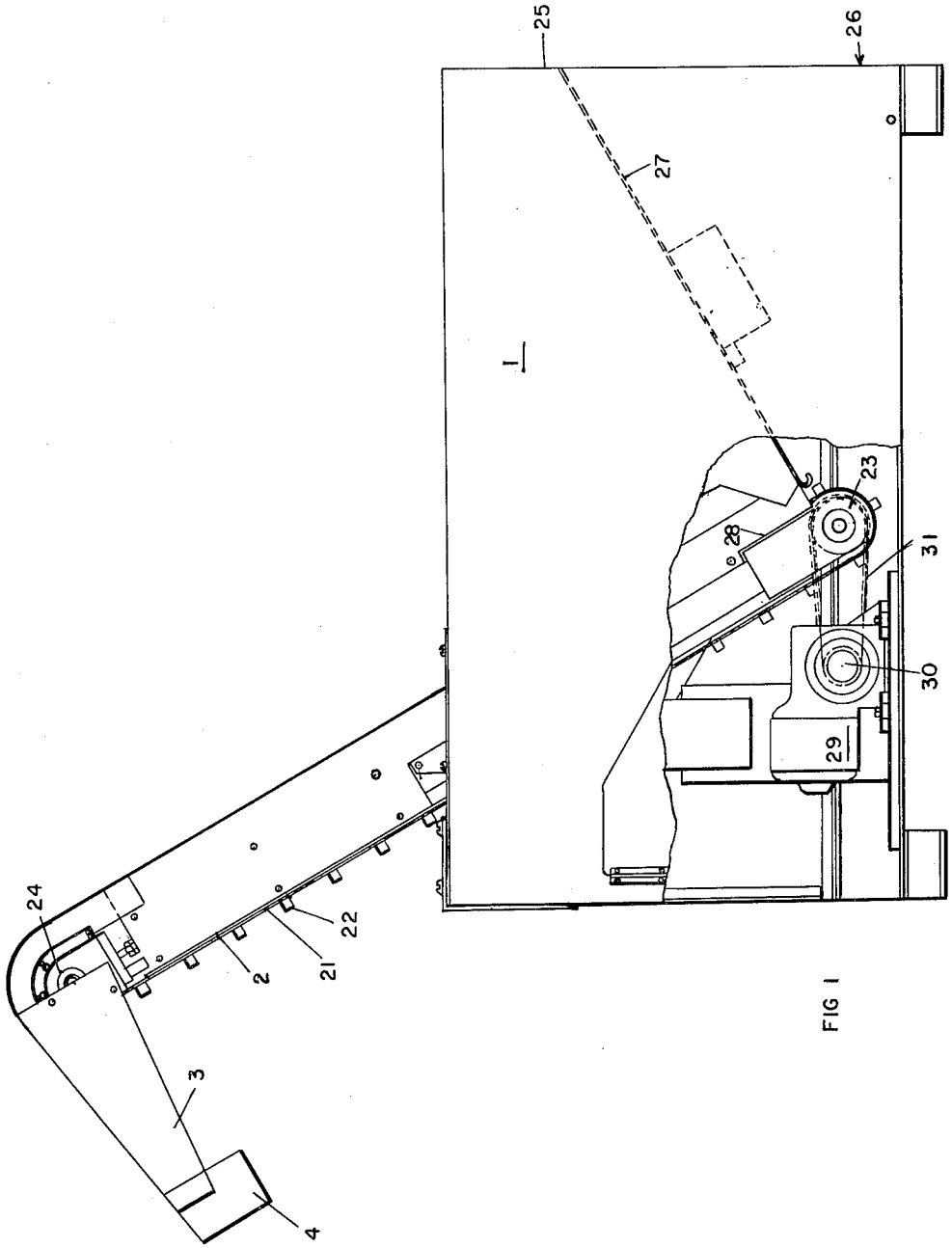
FIG. 1 is a side view partly broken away of a hopper and conveyor which comprise a part of the invention.
Figure 2:
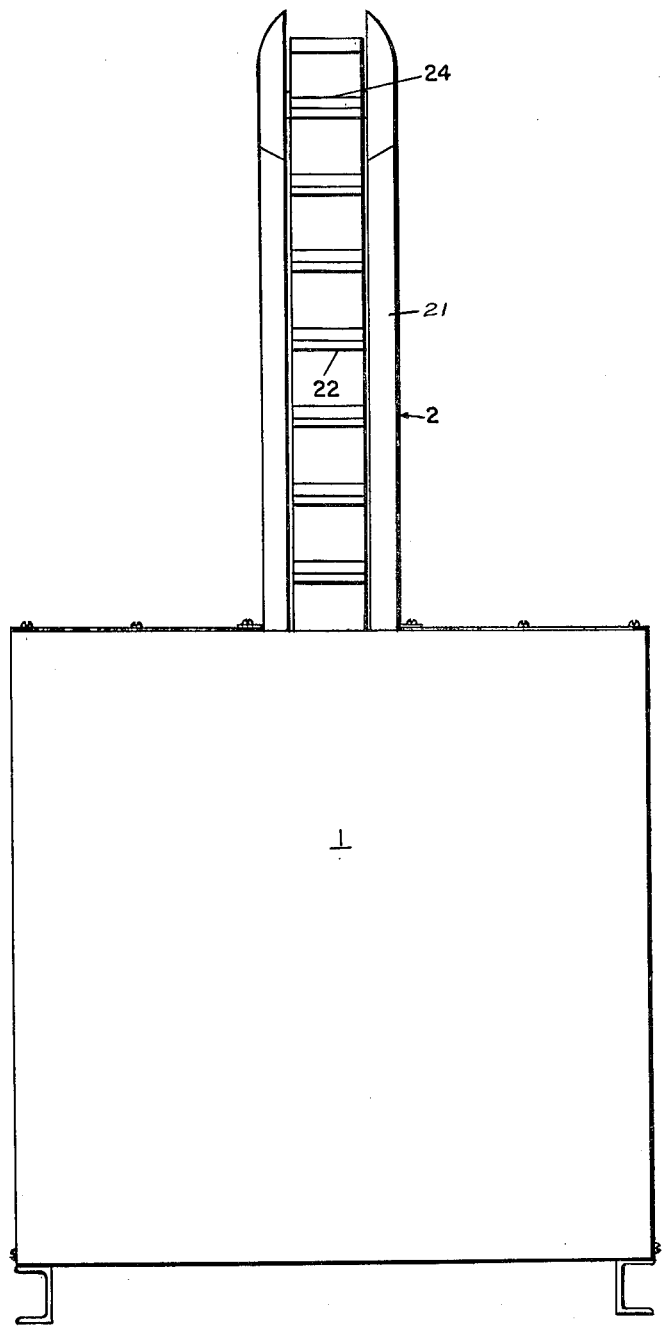
FIG. 2 is an end view of the conveyor and hopper mechanism shown in FIG. 1.

Now with more specific reference to the drawings, a hopper 1 is shown having a conveyor 2 which discharges through a hood 3 shown also in FIG. 3. The hood 3 has an end discharge portion 4 which discharges bases into a vibratory feeder 5. The vibratory feeder 5 is of the type shown in Patent No. 2,609,914 and has a track 6 therein which directs bases 7 therein downwardly to a track 8 into a horizontal portion 9 of the track 8 where the bases 7 are caught by shuttle fingers or bars 10 and moved under a dispenser tank 11 which has poppet valves 12 actuated by rods 13 which terminate at the upper end thereof in members 14. There are a number of poppet valves 12; for example, there are four poppet valves 12 shown, each actuated by a member 14 as shown in FIGS. 7 and 9. The cement dispenser tank 11 used with the mechanism shown in FIGS. 5 and 6 will be identical to that shown in FIGS. 7 and 8 but will have three nozzles instead of four. Each time a group of bases 7 is brought under the poppet valve 12, the poppet valve 12 is actuated, depositing a quantity of cement in each of the bases 7 held thereunder, after which the bases 7 are advanced through a track 17 and discharged into a receptacle where they are ready to be processed in the manufacturing operation described. Nozzles 136 are lowered by a cam 130 into the bases and when the poppet valve 12 opens, a doughnut shaped quantity of cement is discharged around the poppet valve 12. This is squeezed off by the closing of the poppet valve 12 and, thereby, deposited around the inner periphery of the base.

The conveyor 2 in FIG. 1 has a belt 21 having flights 22 spaced thereon which rotate around pulleys 23 and 24. A hopper 25 supported on a frame 26 has a sloping bottom 27 at one end thereof which directs the bases 7 which have been deposited in the hopper 1 downward into engagement with the conveyor 2 at 28. The bases 7 are carried from the hopper 1 by the conveyor 2 which is driven by a gear motor 29 which has a sprocket or pulley 30 thereon which drives through a chain or belt 31 to operate the pulley 23. The bases 7 carried upward by the conveyor 2 are deposited through the hood 3 through the end 4 into the vibratory feeder 5 which is supported on a resilient support and has an intermittent force applied thereto in the usual manner to impart a vibratory motion thereto which will move the bases 7 along a track 301. The bases 7 are put on the bottom 27 of the hopper 1 and will travel up along the inclined tracks 301 and 311 and be discharged into the sloping track 8 where they will feed down to the horizontal portion 9 of the track 8.

The bottom of the feeder 5 is attached to leaf springs 403 at 404 and the leaf springs 403 are attached to a base 402 at 405. An electrical solenoid 400 is fixed to the base 402 and an armature 401 is fixed to the bottom of the feeder 5. The solenoid 400 has a coil thereon excited by intermittent current so that when the coil is intermittently energized, it will be magnetized and will put an intermittent force on the feeder 5, pulling it down and releasing it alternately at a frequency corresponding to the frequency of the intermittent current. The leaf springs 403, being circumferentially mounted on the base 402 and each being mounted at an angle to the base 402, will cause the bowl of the feeder 5 to rotate each time it is pulled down, thus moving the bases 7 along the track 311 in a manner well known to those skilled in the art of this type of feeder. The entire parts feeder is of a well known variety and the operation thereof will be readily understood by persons skilled in the art; however, the control for maintaining the level of parts herein constitutes an improvement.

In order to prevent the bases 7 from the conveyor 2 from being fed into the vibratory feeder 5 at too rapid a rate, a lever 35 having a horizontal portion 36 and an upwardly turned end 37 is pivoted at 38 to a switch member which is connected to an electrical circuit through the motor 29. Therefore, when the bases 7 are arranged in the vibratory feeder 5 at more than one layer deep, the bases will raise the lever 35, pivoting it about the point 38 and opening a switch 38' to shut off the motor 29 to stop any further bases from being fed into the vibratory feeder 5 until the supply of bases in the feeder 5 is reduced to a single layer or a quantity of predetermined thickness. The lever 35 could be set to a high elevation about the bottom 27 of the feeder 5 to allow the bases 7 to stack to a depth of two or more layers.

While the filling process is going on, the vibratory feeder 5 is driven at a constant rate to advance the bases 7 up along the track 6. The shuttle 10 is driven by a motor 40 which drives through a belt 41 which in turn operates a worm wheel 51 to operate the shaft 53 having the cam 130 attached to the upper end thereof which engages the roller 133 on the dispenser tank 11 mounted on the frame. The dispenser tank 11 is mounted on the frame by means of pads 70 which are mounted on plates 71 and 72, respectively, by means of bolts 73 which engage threaded holes 74 in the pads 70. The dispenser tank lift cam wheel 130 has a cam surface 131 on the upper surface thereof and the cam surface 131 engages the roller 133 which moves the dispenser tank 11 up in synchronism with the motion of the fingers and other elements of the machine to lift the nozzles 136 out of engagement with the bases being filled. The rotation of shaft 53 which carries the cam 130 is synchronized with the shuttle bar 10 so that the dispenser tank 11 is lowered to bring the nozzles 136 into sealing engagement with the bases being filled when they are brought under the nozzles 136. The valves 12 are disposed directly over the position 79 on the track 17.

Figure 11:
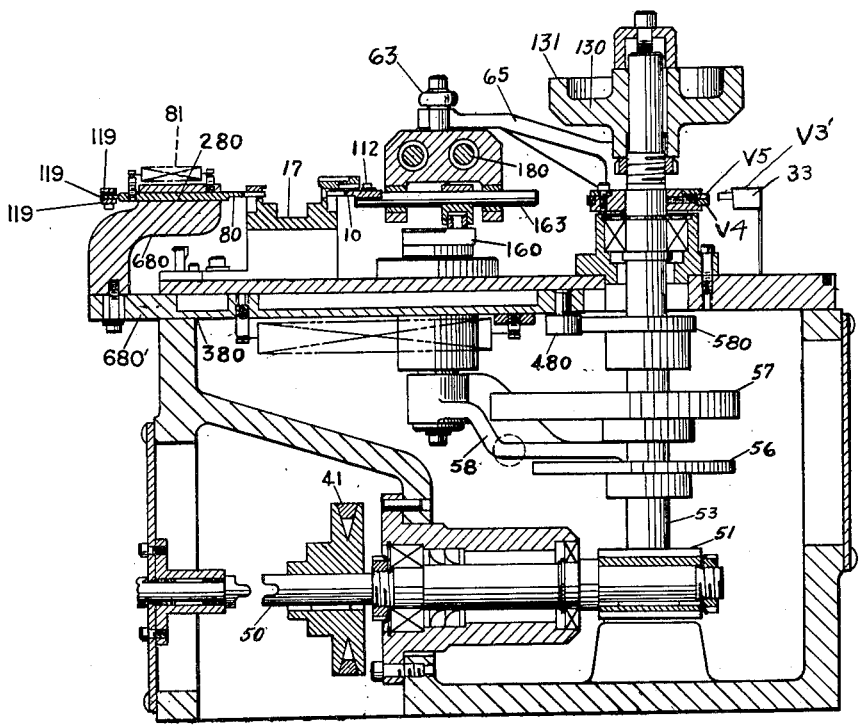
FIG. 11 is a cross sectional view taken on line 11—11 of FIG. 5.

Positioning fingers 80 (see FIGS. 5, 6, and 11), each of which has a part which is slidably received in holes in bracket 680, are spaced along the track 17 and are urged inwardly by means of springs 81 on each advance stroke thereof. The shuttle bar 10 in the example illustrated moves three bases to be filled into alignment with the fingers 80 and the clamp fingers 80 engage the bases and hold them in position against the shuttle fingers on the bar 10 while they are being filled.

The shuttle bar 10 is carried on the supports 163 which are slidably received in bores in a carrier 60 and attached thereto by studs 112. The clamp fingers 80 are each slidably supported on the frame and extend through bores 280 therein. The fingers 80 are urged toward the track 17 by springs 81 attached to the fingers 80 and to the frame. The outside end of each of the fingers 80 has an arm 119 attached thereto which extends perpendicular toward switch lever 83. The arms 119 are stacked one above the other parallel to each other and each has a chamfered end 110 attached thereto. If a base to be filled is loaded in front of each finger 80, each finger and the arm attached to it will be urged outwardly against the force of the springs 81; however, if any one of the fingers 80 does not have a base against it, it will be urged inwardly and the chamfered end 110 of the particular arm 119 will engage and actuate the switch lever 83. The fingers 80 are carried on a bracket 680 in turn attached to a slide 680'. The slide 680' is slidably received in a bore 380 in the machine frame and slides in and out urged by the follower 480 moved by a cam surface on lock cam 580. When a base is moved into place by the fingers on the shuttle bar 10, it is locked in place by the fingers 80 urged by the cam 580 and springs 81. If provisions were not made to stop the machine in the event that less than a full complement of bases were in place, the machine would be inclined to deposit a quantity of cement on the track 17, thereby interfering with the subsequent operation of the machine.

Figure 7:
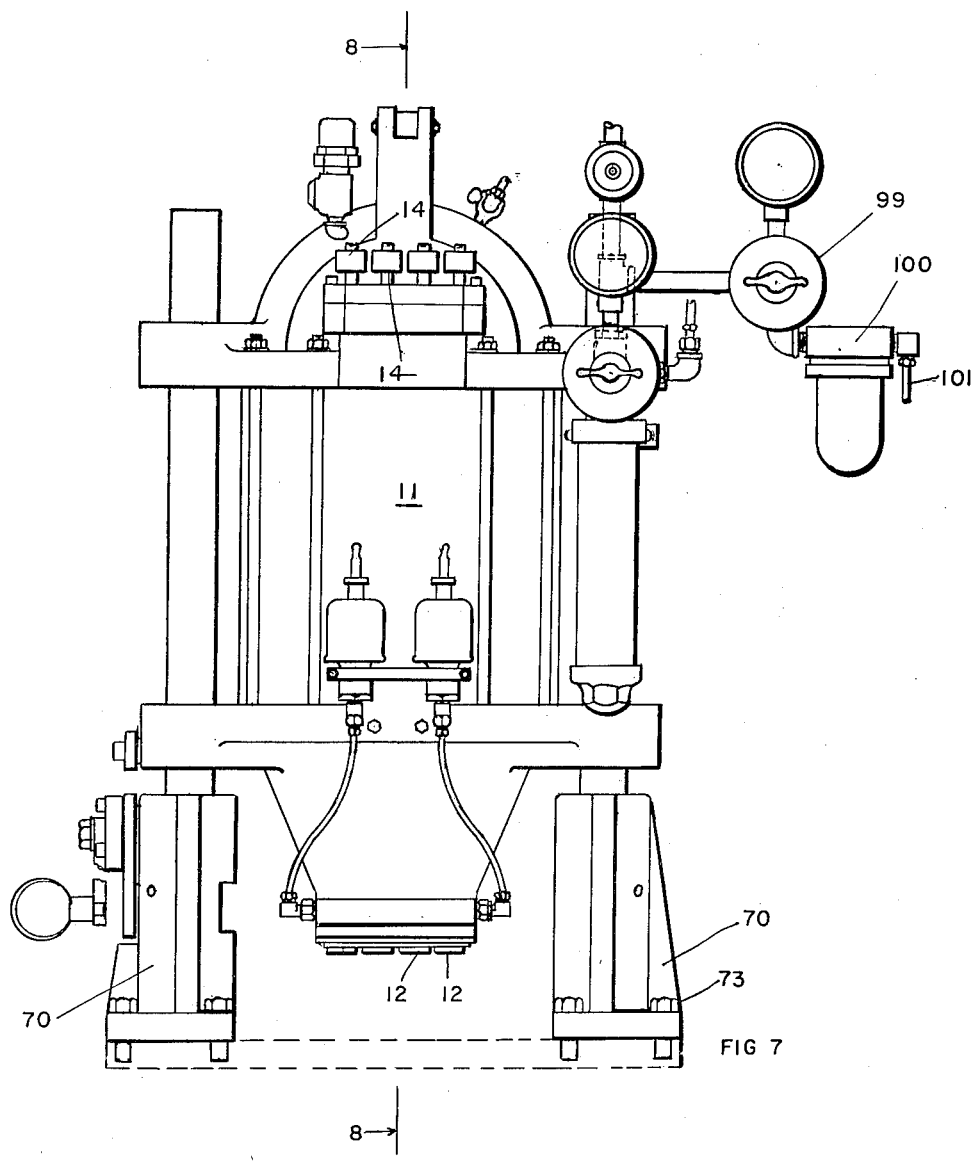
FIG. 7 is a side view of the cement container and dispenser similar to one which could be used with the mechanism shown in FIGS. 5 and 6 but having four cement nozzles.
Figure 8:
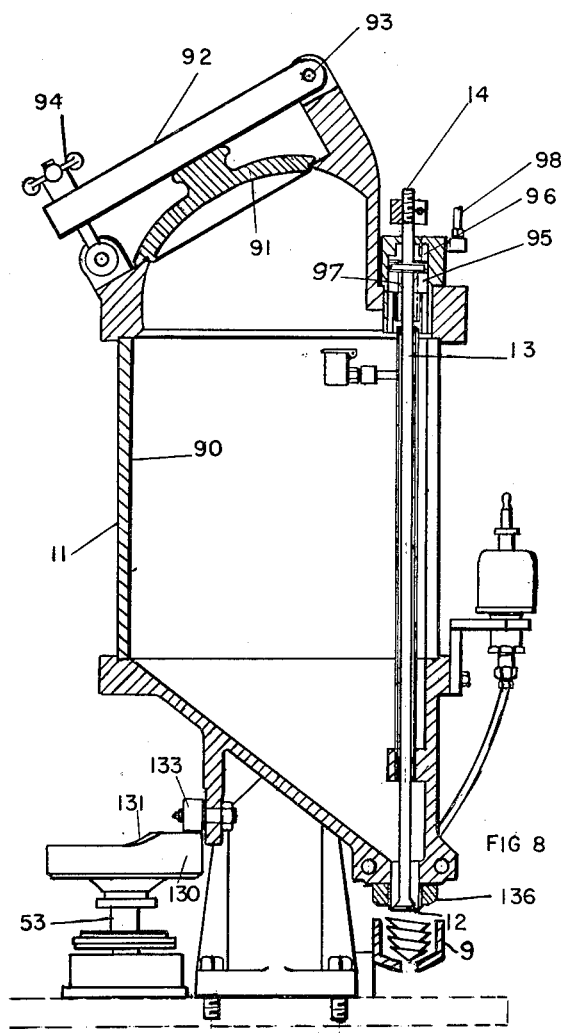
FIG. 8 is a cross sectional view of the dispenser shown in FIG. 7.
Figure 9:
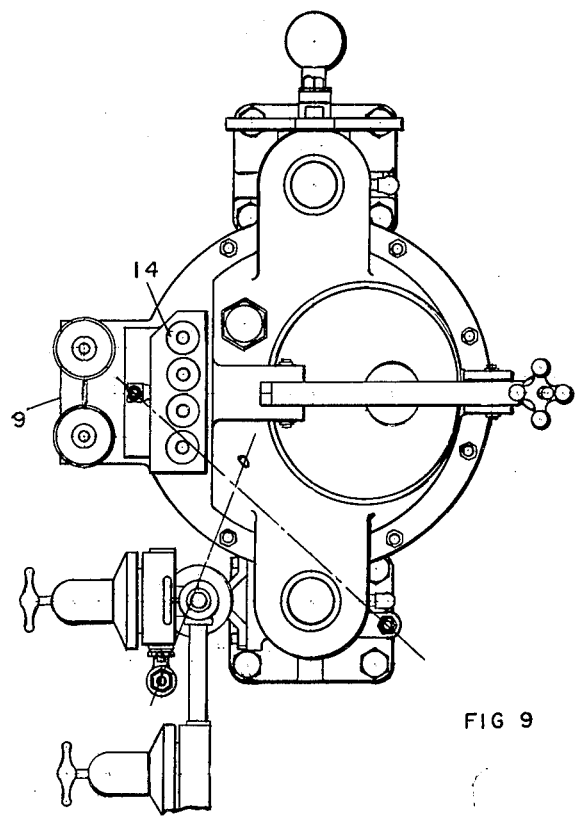
FIG. 9 is a top view of the dispenser shown in FIGS. 7 and 8.

The cement for filling the bases is contained in the dispenser tank 11 shown in FIGS. 7, 8, and 9. A tank 90 has a cover 91 held in place by a lever 92 pivoted at 93 and locked by means of thumb nuts 94. The poppet rods 13 are actuated by means of a piston 95 which is moved downwardly when air is injected into a chamber 96 thereabove and is returned by means of a spring 97 therebelow. Air for the piston 95 is applied by means of a pipe 98 and an oiler 100 from the supply pipe 98 and a pressure regulator 99 for the tank 90 supply air to actuate the piston 95.

Figure 12:
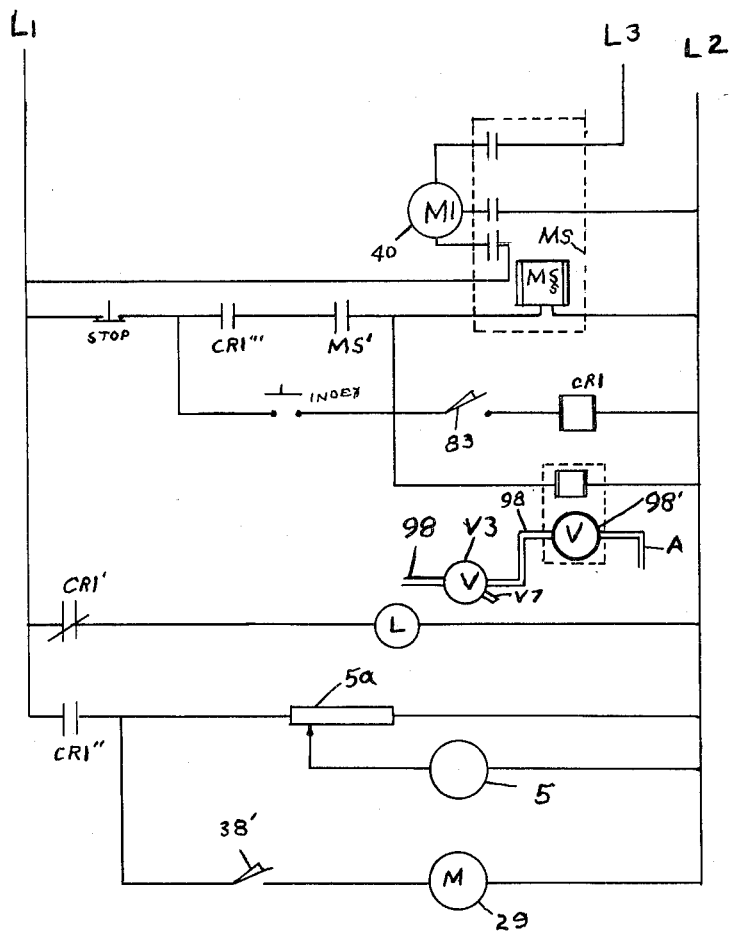
FIG. 12 is an electrical and air circuit diagram of the machine.

The electrical circuit for the device is shown in FIG. 12. The motor 40 is shown connected across the lines L1, L2, and L3. The motor 40 is started when the index switch is pressed which closes a circuit through the solenoid $MS_s$ and energizes it to close the three contacts on the relay MS, thus starting the motor 40 to drive at a constant rate. Pressing the index switch will also complete a circuit through the normally closed switch 83 which is actuated when an article is missing from the shuttle bars 10. This energizes solenoid CR1 which closes CR1" and interlocks the motor solenoid MS which also closes contact MS'. Therefore, the motor 40 will run at a constant rate until a base is missing at the shuttle fingers which will allow the switch 83 to open and deenergize CR1. When CR1 is deenergized, its normally opened contact CR1' will close and energize the trouble light L, indicating that difficulty has been encountered.

The relay CR' will, when energized, also close its normally open contact CR1". This puts power on the feeder 5 through the variable transformer 5a. The motor 29 is also energized through contact CR1" and through the switch 38' as long as less than the predetermined thickness of parts are disposed in the feeder. When the supply of bases in the feeder bowl exceeds a predetermined amount, the switch 38' will be opened and the motor 29 stopped until the supply of parts in the feeder has been depleted to allow the lever and the switch 38' to close again.

A solenoid valve 98' is also energized by the circuit through CR1'" and when CR1 is energized, air may flow through the supply pipe A through the solenoid valve 98' and to the pipe 98 to the cam actuated valve V3. The cam actuated valve V3 is supported on the index unit and actuated by a cam V4 which has a camming surface made up of rings V5 which are fixedly and adjustably clamped to the shaft 53. Therefore, the rings V5 can be adjusted to open the valve V3 by the high spot on the cam engaging the actuating member V3' at a predetermined time so that the air is allowed to flow through the pipe 98 to the chamber 96, thereby opening the valve 12 at a predetermined time. The valve V3 is a three-way valve having an exhaust V7 which exhausts air from the chamber 96 when the cam V4 has rotated its high spot past the actuating member V3', therefore allowing the valve V3 to close.

When three bases to be filled are indexed in a position under the nozzles 136, the dispenser tank 11 will be lowered by the cam 130 and, at the same time, the cam V4 will engage the valve actuating member V3', admitting air to the chamber 96. This will open the poppet valve 12 to inject the cement into the article. Then as the cam 130 continues to rotate along with the rings V5, the air in the chamber 96 will be exhausted and the valve 12 will be forced to a closed position by the spring 97 and the shuttle bar 10 will move three additional bases into position under the base filler.

Figure 5:
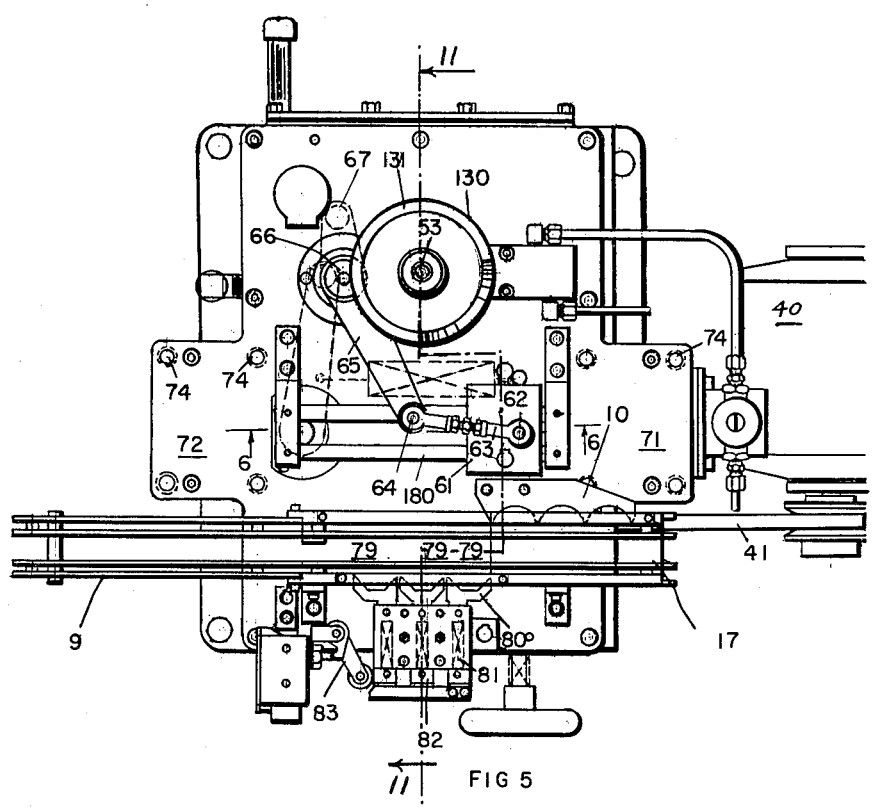
FIG. 5 is a top view of the support for the cement tank with the tank removed showing the mechanism which advances the parts under the filling mechanism.
Figure 6:
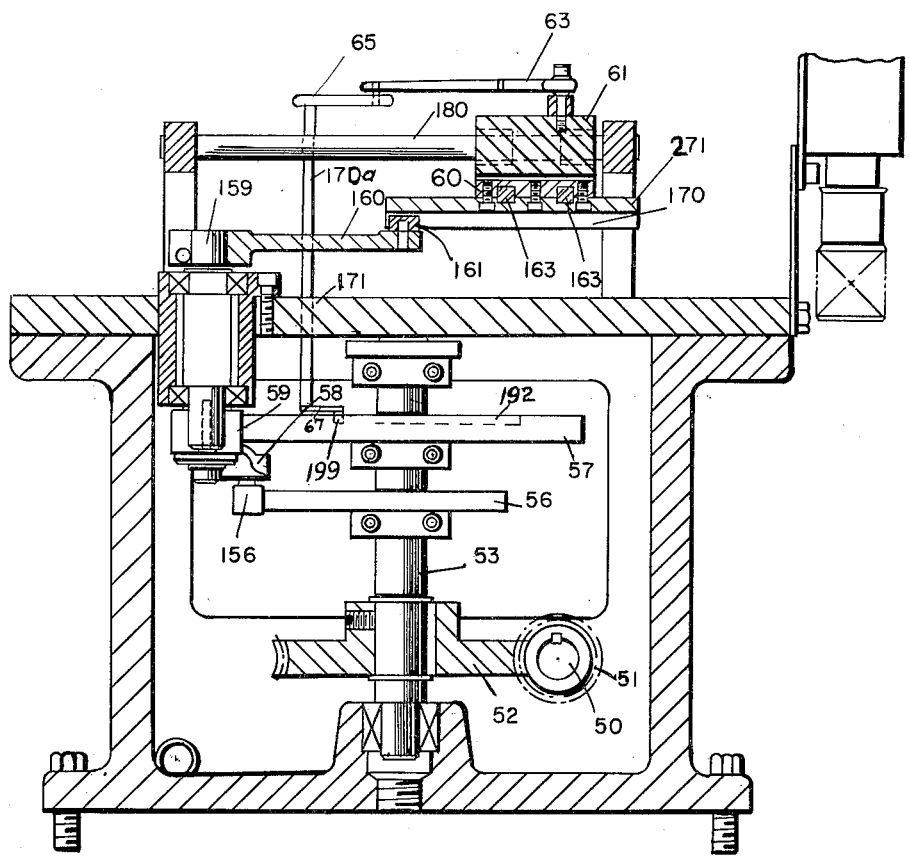
FIG. 6 is a cross sectional view of a part of the machine shown in FIG. 5.

The shuttle fingers of the shuttle bar 10 are carried on bars 163 which are slidably received in the drive mechanism for the shuttle bars shown in FIGS. 5 and 6. In FIG. 6, a shaft 50 is driven by a motor at a constant rate and has a worm wheel 51 thereon which engages a worm wheel 52 to rotate it and, with it, a shaft 53 affixed thereto. A cam 56 and a cam 57 are fixed to the shaft 53 and the cam 56 has a follower 156 on the end thereof which engages a follower 58 to give a shaft 159 a partial rotation on each revolution of the cam 56. A crank 160 is fixed to the upper end of the shaft 159 and it has a follower 161 on the end thereof which slides in a slot 170 in the shuttle bar 10 to slide the lower portion 271 thereof having the fingers carried by supports 163 thereon outwardly and inwardly to engage the articles in the track 17 and index them forward. That is, the crank 160 flexibly connected to the supports 163 at 165 pulls the shuttle bar 10 and fingers thereon out of engagement with the bases in the track 8. Then the crank 65 slides the shuttle bar 10 parallel to the track 8 on a track 180 to lie along three additional bases. Then the follower 58 slides the shuttle bar 10 inwardly to bring the fingers thereon into engagement with the additional bases so they can be advanced on the track by the follower 58. A lug 460 is fixed to the sliding supports 163 and rotatably attached to a pintle 461.

The forward and rearward motion of the shuttle bar 10 is accomplished through a shaft 170a which is supported in bearings 171 in the frame and has a crank 67 on the lower end having a follower 199 which operates in a slot 192 and is actuated by the cam 57 to rotate the shaft 170a and crank 65 attached thereto to pull the crank 63 inwardly and outwardly and to carry block 61 carrying the fingers of the shuttle bar 10 inwardly and outwardly along the track 180. Therefore, as the shaft 53 is rotated by the worm wheel 51, the shuttle bar 10 will retract to the position shown in FIG. 6 past the bases 7 on the track 17. The shuttle bar 10 will then be pushed inwardly toward the track 17 by the crank 160 to engage the bases. Then it will move in an advanced direction along the track 180 carrying the bases to be operated into alignment with clamp fingers 80.

Figure 10:
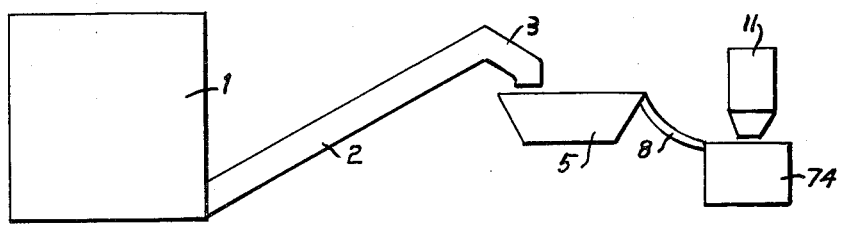
FIG. 10 is a block diagram of the elements of the machine according to the invention.

FIG. 10 shows a schematic diagram of the apparatus disclosed herein. The hopper 1 having the conveyor 2 attached thereto discharges bases into the feeder 5 and the bases from the feeder 5 are carried down the track 8 to the shuttle bar 10 and the cement is disposed from the dispenser tank 11 into the bases as they pass along the track.

During operation, the hopper 1 has the bases 7 deposited therewith to be filled with cement. The bases 7 are carried by the conveyor 2 and deposited in the head 3 of the vibratory feeder 5 where they are shuttled down the track 8 into the horizontal portion of the track 8 at 9 where the shuttle bar 10 engages three of the bases 7 and moves them forward into alignment with the clamp fingers 80 where they are clamped into position by action of cam 580. The clamping operation actuates the air switch which causes air to be delivered into the chamber 96 above the piston 95 and to drive the piston 95 downwardly and open the poppet valve 12 to allow the cement to be extruded into the bases. The air could be controlled by cam actuated valves or any other suitable timing device. When the poppet valves 12 have been held open a predetermined time, they are closed by the spring 97, the cement is immediately shut off abruptly, and the bases 7 are advanced and three more parts are moved into position.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A machine for handling cup shaped bases and depositing a quantity of cement in each said base comprising a vibratory base feeder having means for orienting said bases, means to deposit bases in said vibratory base feeder, means for depositing said cement in said bases, means for transferring said bases to said cement depositing means, said vibratory feeder being operatively connected to said means for depositing said bases, a control means for limiting the quantity of bases in said feeder connecting said means to deposit said bases to said cement depositing means to start and stop said means to deposit bases to said vibratory feeder when the supply of bases in said feeder changes above or below certain limits whereby the quantity of bases in said feeder is limited, said means for limiting the quantity of bases in said feeder comprising a lever swingably attached to an actuating means for said control means, said lever having means on the distal end from said actuating means adapted to be engaged by bases in said vibratory feeder when said bases deposited therein are above a predetermined depth whereby said lever is swung to shut off said means to deposit bases, and means to stop said means for transferring said bases to said cement dispensing means when a said base is missing from said transferring means.

2. The machine recited in claim 1 wherein said lever extends downwardly into said feeder and has a horizontal portion extending over the bases in said feeder, said horizontal portion adapted to engage bases disposed in said feeder.

3. In combination, a cement dispenser and a machine for conveying cup like bases to said dispenser so that said dispenser can deposit a ring of cement around the inner periphery of the rim of each of said cup like bases so conveyed, said cement dispenser comprising a container on said machine having a bottom sloping downwardly and terminating at an opening in the bottom thereof, a nozzle rigidly connected to said container extending from said opening having an opening therethrough communicating with the inside of said container and adapted to be lowered into a said cup shaped base, a poppet type valve in said opening, said valve movable to a position outward of said nozzle, means to actuate said valve, said container being supported on said machine, said machine comprising a track for conducting cup shaped bases into position below said container, said nozzle having means thereon concentric therewith to engage the rims of said bases, said machine further comprising a cam wheel having an edge thereof engaging a follower on said container, means on said machine synchronized with the movement of said cup like bases driving said cam wheel whereby said nozzle is lowered into said bases to deposit cement therein and then lifted out of said bases after said bases have said cement deposited therein.

4. The dispenser recited in claim 3 wherein a plurality of openings are provided in the bottom of said container in alignment with said track and a plurality of said nozzles on said container for connecting said openings to bases supported on said track, and feeding means comprising a shuttle bar advancing said bases intermittently under said nozzles.

5. The dispenser recited in claim 4 wherein holding fingers are provided to hold said bases in place under said nozzles while said container is being lowered, and means is provided to interrupt the operation of said poppet valve when less than a full complement of bases is present under said nozzle.

6. In combination, a machine for handling hollow bases and a cement dispensing means for depositing a ring of cement around the inner periphery thereof, said machine comprising a vibratory feeder, means to sort said bases and dispose said bases with open ends facing said cement dispensing means, said cement dispensing means comprising a nozzle having an opening therethrough and having an enlarged opening at the discharge end thereof with the edge of said opening tapering outwardly, and a valve adapted to move into seating engagement with said outwardly tapering edge, said valve having an edge complementary in shape to said nozzle edge and adapted to engage said nozzle edge, said valve edge when moved to an open position being adapted to allow a quantity of cement cylindrical in shape to flow from said nozzle, said valve when closed adapted to extrude the excess cement from said nozzle and to urge said cylindrical quantity into engagement with the inside surface of said hollow base, said machine further comprising means connected to said cement dispensing means for lowering and lifting said nozzle for lowering said nozzle into proximate relation with the inside of each said base while said cement is extended from said nozzle and to lift said nozzle out of proximate relation with the inside of each said base after said cement is extruded thereon.

References Cited in the file of this patent

UNITED STATES PATENTS

| | | |
|---|---|---|
| 990,549 | Hampel | Apr. 25, 1911 |
| 1,072,290 | Wood et al. | Sept. 2, 1913 |
| 1,137,128 | Geyer | Apr. 27, 1915 |
| 1,169,499 | LaPorte | Jan. 25, 1916 |
| 1,365,773 | Dickerson | Jan. 18, 1921 |
| 1,703,434 | Smith | Feb. 26, 1929 |
| 1,915,066 | Meyer | June 20, 1933 |
| 2,557,623 | Wenner | June 19, 1951 |
| 2,593,535 | Cannon | Apr. 22, 1952 |
| 2,609,914 | Balsiger et al. | Sept. 9, 1952 |
| 2,658,602 | Bonnano et al. | Nov. 10, 1953 |
| 2,669,949 | Cottingham | Feb. 23, 1954 |
| 2,692,717 | Spurr | Oct. 26, 1954 |
| 2,761,605 | Pahl et al. | Sept. 4, 1956 |
| 2,761,607 | Ayars | Sept. 4, 1956 |
| 2,817,461 | Gilberty | Dec. 24, 1957 |
| 2,827,928 | Guckel | Mar. 25, 1958 |
| 2,851,198 | Rasmussen | Sept. 9, 1958 |